(12) United States Patent
Polland

(10) Patent No.: US 8,462,814 B2
(45) Date of Patent: Jun. 11, 2013

(54) INTERNET PROTOCOL USING ETHERNET FIRST MILE PHYSICAL LAYER

(75) Inventor: Joe Polland, Raleigh, NC (US)

(73) Assignee: ADC DSL Systems, Inc., Shakopee, MN (US)

( * ) Notice: Subject to any disclaimer, the term of this patent is extended or adjusted under 35 U.S.C. 154(b) by 978 days.

(21) Appl. No.: 11/566,469

(22) Filed: Dec. 4, 2006

(65) Prior Publication Data

US 2008/0130659 A1 Jun. 5, 2008

(51) Int. Cl.
*H04L 3/16* (2006.01)
*H04L 29/06* (2006.01)

(52) U.S. Cl.
CPC ............ *H04L 29/06* (2013.01); *H04L 29/0653* (2013.01); *H04L 29/06095* (2013.01); *Y10S 370/902* (2013.01); *Y10S 370/903* (2013.01); *Y10S 370/907* (2013.01)
USPC ..... 370/469; 370/389; 370/395.1; 370/395.5; 370/395.52; 370/395.6; 370/395.61; 370/401; 370/428; 370/465; 370/467; 370/473; 370/474; 370/902; 370/903; 370/907

(58) Field of Classification Search
None
See application file for complete search history.

(56) References Cited

U.S. PATENT DOCUMENTS 6,668,297 B1 * 12/2003 Karr et al. ................. 710/305
6,785,265 B2 * 8/2004 White et al. .............. 370/352
6,952,395 B1 * 10/2005 Manoharan et al. ......... 370/219
7,986,622 B2 * 7/2011 Frazier et al. ............. 370/229
2008/0002731 A1 1/2008 Tripathi et al.

OTHER PUBLICATIONS

IEEE- 802.3ah, Ethernet in the First Mile, 2004.*
IEEE 802.3ah, Sep. 2004.*
Eric D. Kapp, IP DSL:Keeping It Simple—Internet Protocol; Digital Subscriber Line, Dec. 2000.*
Lattice Semiconductor Corporation; POS-PHY Level 3 Physical Layer Interface; Jul. 2002.*
"Product Brief: Socrates 4e/ 2e/ 1e", Jan. 2005, pp. 12, Publisher: Infineon Technologies AG.

* cited by examiner

*Primary Examiner* — Faruk Hamza
*Assistant Examiner* — Aixa A Guadalupe Cruz
(74) *Attorney, Agent, or Firm* — Fogg & Powers LLC

(57) ABSTRACT

A method to transmit and receive Internet protocol data packets comprising running an Internet protocol application, outputting an Internet protocol data packet based on the running of the Internet protocol application and transmitting the Internet protocol data packet via a physical layer compliant with Ethernet first mile standards.

32 Claims, 10 Drawing Sheets

INTERNET PROTOCOL USING ETHERNET FIRST MILE PHYSICAL LAYER

BACKGROUND

When configured in routing mode, Internet protocol (IP) data packets may be sent and received across the digital subscriber line (DSL) interfaces. There are a number of standard methods used by vendors to do this, most notably asynchronous transfer mode (ATM) and ATM adaptation layer version 5 (AAL5). However, ATM has shortcomings, in that it is not a native packet based solution.

There are other issues to be solved when sending Internet protocol data packets over digital subscriber line interfaces, such as bonding a plurality of DSL ports together to form a single higher speed logical link. There are standard solutions to bonding, such as M-pair mode defined in G.991.2 for high density digital subscriber lines G.SHDSL interfaces. However, M-pair mode for G.SHDSL does not allow any dynamic change to the number of links in the bonded group while the group is active.

SUMMARY

In one embodiment, a method to transmit and receive Internet protocol data packets comprising running an Internet protocol application, outputting an Internet protocol data packet based on the running of the Internet protocol application and transmitting the Internet protocol data packet via a physical layer compliant with Ethernet first mile standards.

In another embodiment, a system to transfer Internet protocol data packets including a first digital subscriber line device compliant with Ethernet first mile standards configured to receive output from an Internet protocol application via a first interface, a digital subscriber line bonded group communicatively coupled to the first digital subscriber line device and a second digital subscriber line device communicatively coupled to the digital subscriber line bonded group. The second digital subscriber line device is communicatively coupled to the first digital subscriber line device. The first digital subscriber line device and the second digital subscriber line device are configured to transfer Internet protocol data packets across the first interface and second interface, respectively.

In yet another embodiment, a system architecture to transfer Internet protocol data packets including a network processor configured to transmit Internet protocol data packets, a physical interface communicatively coupled to the network processor and a digital subscriber line device compliant with Ethernet first mile standards communicatively coupled to the network processor via the physical interface. The digital subscriber line device is configured to pass the Internet protocol data packets.

In yet another embodiment, a method to transmit and receive Internet protocol data packets including running an Internet protocol application, transferring the Internet protocol data packet across a physical interface to a physical layer compliant with Ethernet first mile standards, sending an Internet protocol data packet to a first digital subscriber line device and receiving the Internet protocol data packet at a second digital subscriber line device communicatively coupled to the first digital subscriber line device.

DRAWINGS

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

A solution to the above mentioned problems requires a method to flexibly send IP over digital subscriber line in a system that is native packet based and that allows for dynamic bonding of DSL links during system operation. Ethernet first mile (EFM) is a protocol is designed to send Ethernet frames over DSL as defined in IEEE 802.3ah. When the Ethernet first mile physical layer is modified (e.g., removing the Ethernet and MAC layers and replacing them with Internet protocol) the resultant protocol stack offers a data transport for Internet protocol data packets that is a native packet based solution and that includes bonding capabilities built in with a physical aggregation function that allows DSL links to be added and removed while the bonded group is active.

Figure 1:
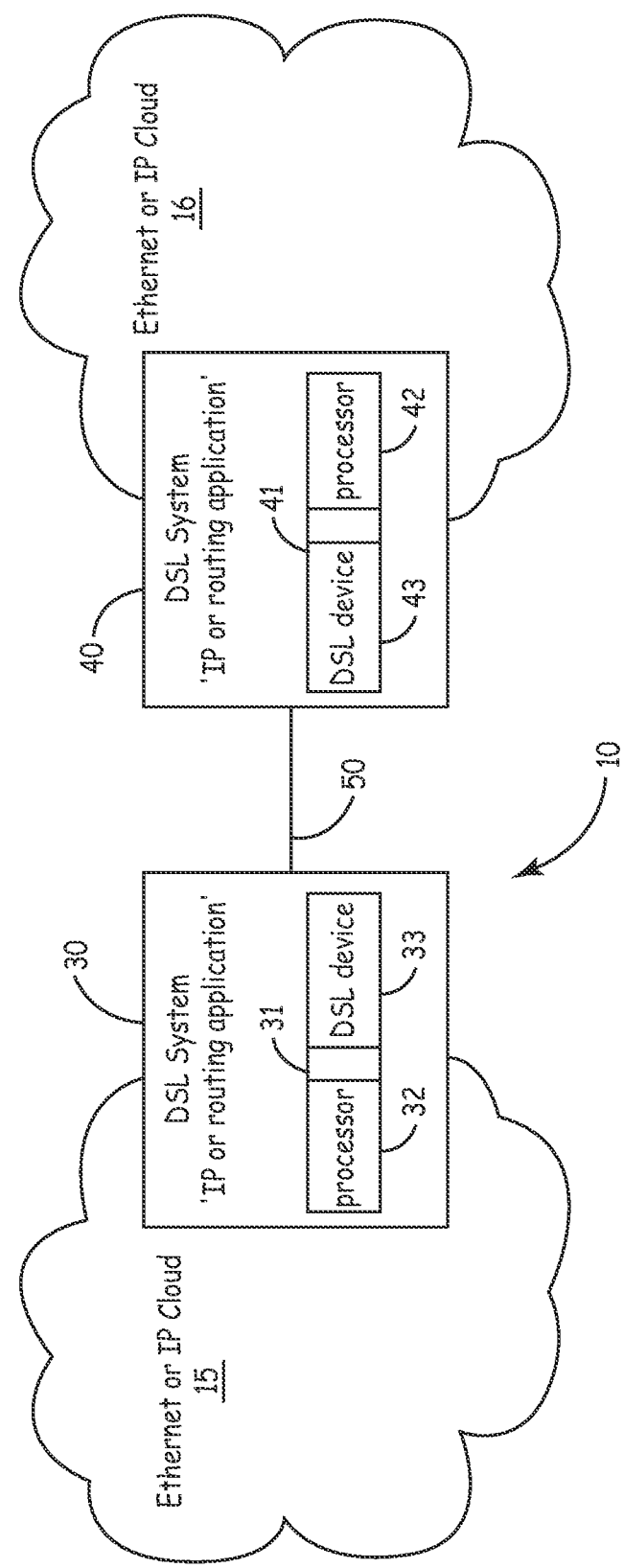
FIG. 1 is a block diagram of one embodiment of a system to transfer Internet protocol data packets in accordance with the present invention.

FIG. 1 is a block diagram of one embodiment of a system 10 to transfer Internet protocol data packets in accordance with the present invention. The system includes a first and second digital subscriber line (DSL) system 30 and 40 for Internet protocol or routing applications that are communicatively coupled to Ethernet or Internet protocol networks 15 and 16, respectively. The first DSL system 30 is communicatively coupled to the second DSL system 40 by a digital subscriber line bonded group 50.

In the first DSL system 30, the first DSL device 33 receives output, in the form of an Internet protocol data packet, from the Internet protocol application that is run by the processor 32. Such Internet protocol data packets are received at the first DSL device 33 via a first interface 31. In the second DSL system 40, the second DSL device 43 outputs an Internet protocol data packet, to be sent to the Internet protocol application that is run by the processor 42. Such Internet protocol data packets are sent from the second DSL device 43 via a second interface 41. Since system 10 is bidirectional, the first DSL device 33 also outputs an Internet protocol data packet that is sent via a first interface 31 to the Internet protocol application that is run by the processor 32 and the second DSL device 43 receives output (via the second interface 41) in the form of an Internet protocol data packet, from the Internet protocol application that is run by the processor 42.

The first DSL device 33 and the second DSL device 43 are compliant with Ethernet first mile standards and are configured in a routing mode. In one implementation of this embodiment, the physical medium of the first DSL device 33 and/or the second DSL device 43 are compliant with at least one of ITU G.991.2 SGDSL or the VDSL standard, ANSI T1.424. The first DSL device 33 and the second DSL device 43 each pass Internet protocol data packets to the digital subscriber line bonded group 50.

In one implementation of this embodiment, the first interface 31 and the second interface 41 are passive optical system physical layer (POS-PHY) interfaces. In another implementation of this embodiment, either the first interface 31 or the second interface 41 is a POS-PHY interface.

In yet another implementation of this embodiment, the digital subscriber line bonded group comprises a plurality of digital subscriber line bonded pairs. In another implementation of this embodiment, the digital subscriber line bonded group comprises a single digital subscriber line bonded pair.

Thus as shown in FIG. 1, two DSL systems 30 and 40 are connected over digital subscriber line bonded group 50, and both DSL systems 30 and 40 include DSL devices or units that are running an IP application, such as a routing protocol. In this case, both DSL systems 30 and 40 are configured in routing mode. This document describes how IP is sent across the DSL interface by combining an Ethernet first mile Physical Layer with an IP layer. The digital subscriber line bonded group 50 may be a single pair, or multiple pairs. In an embodiment in which the links in the digital subscriber line bonded group 50 are configured according to G.SHDSL standards, one end (interfacing with the DSL system 30, for example) is configured as STU-C and the other end (interfacing with the DSL system 30, for example) is configured as STU-R. However, it is not really a central office/remote location application, as both DSL systems 30 and 40 are part of an Ethernet or IP cloud. In one implementation of this embodiment, the DSL systems 30 and 40 are located at different sites. In one implementation of this embodiment, system 10 includes multiple digital subscriber line bonded groups 50.

Figure 2:
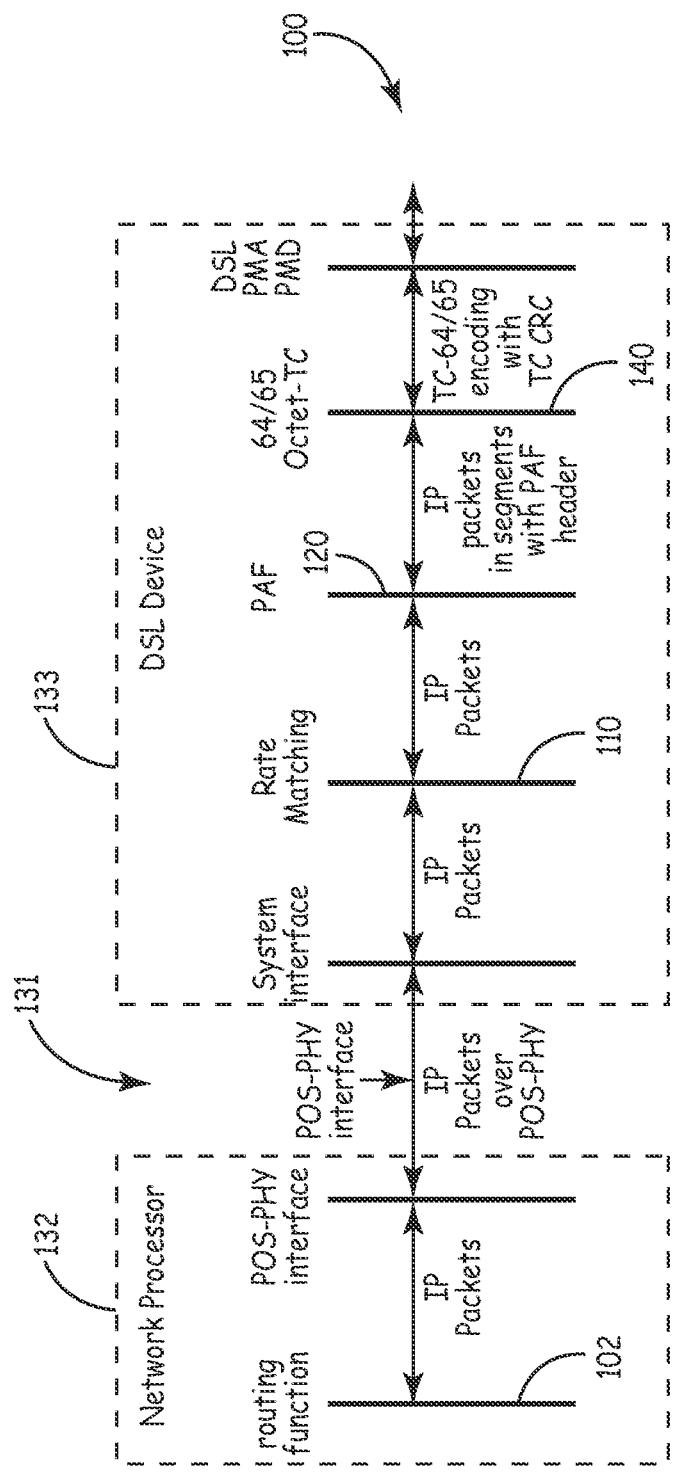
FIG. 2 is a block diagram of one embodiment of a data path in a system to transfer Internet protocol data packets in accordance with the present invention.

FIG. 2 is a block diagram of one embodiment of a data path represented generally by the numeral 100 in a system 10 to transfer Internet protocol data packets in accordance with the present invention. The system architecture uses a network processor 132, which implements Internet protocol applications and which connects to a DSL device 133. The DSL device 133 provides DSL connectivity in the system 10. When the network processor 132 is in IP application mode, Internet protocol data packets are sent, received, and processed. A typical example is a routing application. In a routing mode, some application decisions require Internet protocol data packets to be sent across DSL interfaces, such as physical layer interface 131 so that Internet protocol data packets interface directly with an Ethernet first mile physical layer. The sending of Ethernet packets is not described in this document, but the terminology "Ethernet first mile" is used throughout to be consistent with IEEE 802.3ah specification.

At the physical layer, the data path 100 passes though various functional blocks which are indicated in FIG. 2 as routing function 102, rate matching functional block 110, physical aggregation functional (PAF) block 120 and transmission convergence (TC) encoding functional block 140. The routing function 102 is implemented in the network processor 132. The rate matching functional block 110 matches the rates between the physical layer and the upper layers. Physical aggregation functional block 120 fragments and reassembles Internet protocol data packets in a physical layer function. Physical aggregation functional block 120 fragments and combines multiple links together to form a higher speed logical link. Transmission convergence encoding functional block 140 performs 64/65 octet transmission convergence as defined in IEEE 802.3ah, where 64 bytes from PAF are encapsulated to 65 bytes. The terms "byte" and "octet" are used interchangeably is this document. The rate matching functional block 110, the physical aggregation functional block 120 and the transmission convergence encoding functional block 140, which are all Ethernet first mile functions, are implemented on the Internet protocol data packets in the data path 100 as described below.

The Internet protocol data packets output by the routing function 102 are passed through the physical layer interface 131 (referred to as a passive optical system physical layer (POS-PHY) interface 131) to the DSL device 133. Rate matching functional block 110 sends and receives Internet protocol data packets between the physical layer interface 131 and physical aggregation functional block 120. In the IEEE 802.3ah specification, rate matching interface to the upper layer is defined as a MAC MII interface. In contrast, system 10 uses a passive optical system physical layer (POS-PHY) to send IPv4, or IPv6 packets between rate matching and upper layers.

Rate matching, as defined in IEEE 802.3ah, must remove preamble bytes, and start of frame byte from Ethernet packets in the transmit direction, and prepend a preamble and start of frame byte to the Ethernet packet in the receive direction. This is not required when the system 10 transmits and receives Internet protocol data packets, since Internet protocol data packets do not have preambles or start of frame bytes.

Physical aggregation functional block 120 implements the functionality of an Ethernet first mile physical aggregation function to fragment Internet protocol data packets and to combine multiple links together to form a higher speed logical link. The function of the physical aggregation functional block 120 is defined in IEEE 802.3ah.

Physical aggregation functional block 120 accepts IP version 4, or IP version 6 data packets. In another implementation of this embodiment, physical aggregation functional block 120 accepts data packets generated by IP protocols yet to be developed. The physical aggregation function (PAF) complies with 802.3ah, and is an optional block in the data path 100 when Internet protocol data packets and not Ethernet frames are being fragmented as shown in FIG. 3.

Figure 3:
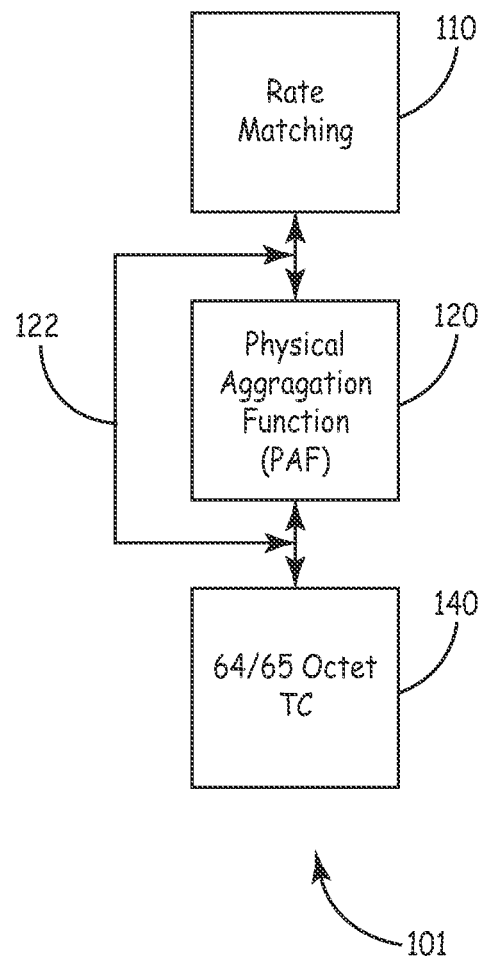
FIG. 3 is a block diagram of one embodiment of a portion of a data path in a system to transfer Internet protocol data packets in accordance with the present invention.

FIG. 3 is a block diagram of one embodiment of a portion 101 of a data path 100 in a system 10 (FIG. 1) to transfer Internet protocol data packets in accordance with the present invention. When the system 10 is configured to link to the destination via a single DSL pair, no physical aggregation function is required, and the physical aggregation functional block 120 is bypassed. In this case, the Internet protocol data packet is not fragmented and the Internet protocol data packets are sent directly from (or to) the rate matching functional block 110 to (or from) the transmission convergence encoding functional block 140 as indicated by the double arrowed line 122.

When there are two or more DSL pairs available for data transmission to the same remote destination, a single logical link, referred to herein as a physical aggregation function group, is created to aggregate the data traffic to the remote destination. The system 10 connects the relevant DSL pairs to the physical aggregation function group via associated transmission convergence instances (64/65 octet TC), as defined in 802.3ah.

When the physical aggregation functional block 120 segments the data packet into fragments, a physical aggregation function (PAF) header is prepended to each fragment. PAF headers contain a fourteen bit sequence number in a sequence ID field, a start of packet bit in a begin field, and end-of-packet bit in an end field. The PAF headers, the fragment sizes, and error handling are all compliant with 802.3ah. The sequence numbers are used in reassembly of the fragments at the receiver end of the system 10.

At a receiver end, the physical coding sublayer 211 is implemented, as shown below with reference to FIG. 6. The PAF receive accepts multiple fragments encapsulated in multiple 64/65 octet TC blocks, and reassembles a complete IP version 4 or IP version 6 packet. The reassembled packet is then passed to the rate matching functional block 111 (FIG. 6) of the receiving device (such as DSL device 43 shown in FIG. 1).

The transmission convergence encoding functional block 140 encapsulates PAF fragments if the physical aggregation functional block 120 is implemented. The transmission convergence encoding functional block 140 encapsulates entire Internet protocol data packets if the physical aggregation functional block 120 is bypassed in the portion 101 of the data path 100. Before encapsulation, a cyclic redundancy check (CRC) is appended to each Internet protocol data packet or fragment. The CRC is 32 or 16 bits, as defined in 802.3ah. A state machine synchronizes the transmission of the fragments from the transmission convergence layer.

Figure 4:
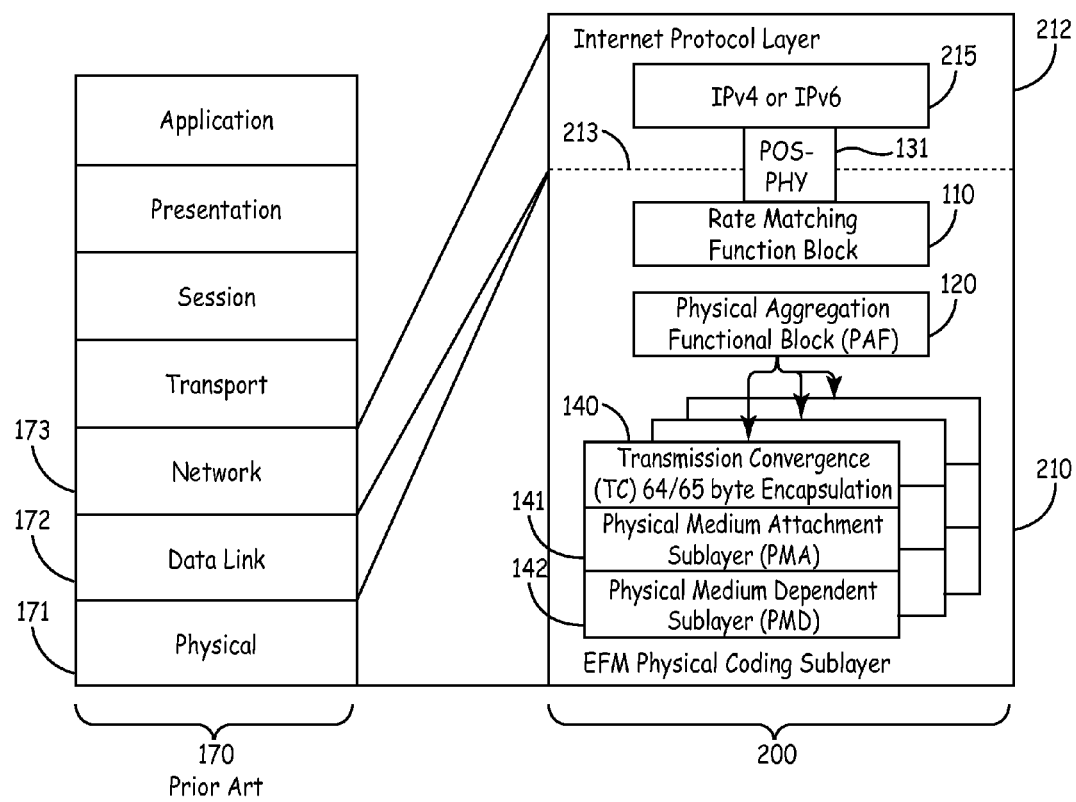
FIG. 4 is a block diagram of one embodiment of a protocol stack enabled to transfer Internet protocol data packets in accordance with the present invention mapped to a prior art protocol stack.

FIG. 4 is a block diagram of one embodiment of a protocol stack 200 enabled to transfer Internet protocol data packets in accordance with the present invention. Such a protocol stack can be implemented in system 10 of FIG. 1. The protocol stack 200 is mapped to a model of a prior art OSI protocol stack 170 in order to point out the difference between the OSI protocol stack 170 and the protocol stack 200. The prior art protocol stack 170 includes a network layer 173 above a data link layer 172, which is above a physical layer 171. The protocol stack 200 includes an Internet protocol layer 212 above the physical layer 210. The physical layer 210 maps to the physical layer 171 of the OSI model, and the Internet protocol layer 212 maps to the network layer 173 of the OSI model. There is no equivalent to the data link layer 172 (layer 2) of the OSI model in the protocol stack 200 so the date link layer 172 is mapped to the dashed line 213. In this model, the data link layer 2 is a null layer and the Ethernet layer 2, shown as data link layer 172 in the prior art protocol stack 170, is not implemented in the system.

The physical layer 210 of protocol stack 200 is a physical coding sublayer 210 compliant with the Ethernet first mile (EFM) IEEE 802.3ah standards. Hence, the terms "physical layer 210," "physical coding sublayer 210," and "Ethernet first mile layer 210" are used interchangeably. However, no Ethernet packets are used in the system described herein. Above the physical coding sublayer 210 is the Internet protocol layer 212. In one implementation of this embodiment, the Internet protocol layer 212 includes IP version 4 and/or IP version 6 applications 215. The Internet protocol layer 212 communicates directly with the physical coding sublayer 210, using POS-PHY interface 131.

As shown in FIG. 2, the DSL device 133 is connected to the network processor 132 using a 16 bit POS-PHY interface 131. Table 1 shows the format of TPv4 packet transfer across the POS-PHY interface 131 using the protocol stack 200 of FIG. 4.

TABLE 1

| D15 | D8 | D7 | D0 |
|---|---|---|---|
| Version | Header Len | Type Of Service | |
| Total Length | | | |
| 16 bit identification | | | |
| Flags | | Fragment Offset | |
| TTL | | Protocol | |
| Header Checksum | | | |
| Source IP address byte 1 | | Source IP address byte 2 | |
| Source IP address byte 3 | | Source IP address byte 4 | |
| Destination IP address byte 1 | | Destination IP address byte 2 | |
| Destination IP address byte 3 | | Destination IP address byte 4 | |
| Optional options | | Optional options | |
| Optional options | | Optional options | |
| Data | | Data | |
| . | | . | |
| . | | . | |
| . | | . | |
| Data | | Data | |

Table 2 shows the format of TPv6 packet transfer across the POS-PHY interface 131 using the protocol stack 200 of FIG. 4.

TABLE 2

| D15 | D8 | D7 | D0 |
|---|---|---|---|
| Version | Traffic Class | Flow Label | |
| Flow Label (continued) | | | |
| Payload Length | | | |
| Next Header | | Hop Limit | |
| Source IP address byte 1 | | Source IP address byte 2 | |
| Source IP address byte 3 | | Source IP address byte 4 | |
| Source IP address byte 5 | | Source IP address byte 6 | |
| Source IP address byte 7 | | Source IP address byte 8 | |
| Source IP address byte 9 | | Source IP address byte 10 | |
| Source IP address byte 11 | | Source IP address byte 12 | |
| Source IP address byte 13 | | Source IP address byte 14 | |
| Source IP address byte 15 | | Source IP address byte 16 | |
| Dest IP address byte 1 | | Dest IP address byte 2 | |
| Dest IP address byte 3 | | Dest IP address byte 4 | |
| Dest IP address byte 5 | | Dest IP address byte 6 | |
| Dest IP address byte 7 | | Dest IP address byte 8 | |
| Dest IP address byte 9 | | Dest IP address byte `0 | |
| Dest IP address byte 11 | | Dest IP address byte 12 | |
| Dest IP address byte 13 | | Dest IP address byte 14 | |
| Dest IP address byte 15 | | Dest IP address byte 16 | |
| Data | | Data | |
| . | | . | |
| . | | . | |
| . | | . | |
| Data | | Data | |

The physical layer 210 includes the rate matching functional block 110 configured to match a rate of the physical coding sublayer 210 to the upper layer 212. The physical coding sublayer 210 of protocol stack 200 also includes the physical aggregation functional block 120 that fragments the data packet into fragments of either fixed or variable size as described above with reference to FIG. 2.

The physical coding sublayer 210 also includes at least one transmission convergence encoding block 140 configured to encode an Internet protocol data packet with a cyclic redundancy check (CRC). If the data packet is fragmented then each fragment goes to a separate transmission convergence encoding block 140. In one implementation of this embodiment, the transmission convergence encoding blocks 140 encapsulate 64 octets to 65 octets in accordance with the Institute of Electrical and Electronics Engineers 802.3ah standards. The physical medium attachment (PMA) layer 141 and the physical medium dependent sublayer (PMD) 142 in the physical coding sublayer 210 are configured to connect the digital subscriber line bonded pair to the digital subscriber link device 33.

In one implementation, system 10 is configured for only one digital subscriber link port and the physical aggregation functional block 120 is bypassed as described above with reference to FIG. 3. In this case, the Internet protocol data packets are sent directly from the rate matching functional block 110 to the transmission convergence encoding block 140 and across a single digital subscriber link. In the opposite direction, received Internet protocol data packets are directly passed from the transmission convergence encoding block 140 to the rate matching functional block 110.

In another implementation, system 10 is configured with four digital subscriber links in a bonded group. In this case, when the Internet protocol data packet is less than or equal to minimum fragment size, the Internet protocol data packet is not fragmented. However, the physical aggregation functional block 120 is still used so that a PAF header is added and start of packet/end of packet bits are set. The Internet protocol data packet is sent across only one of the four links in the bonded group. In the opposite direction, received Internet protocol data packets received from the bonded group that are less than or equal to minimum fragment size include a PAF header and set start of packet/end of packet bits. These received Internet protocol data packets are passed from the transmission convergence encoding block 140 to the physical aggregation functional block 120 in compliance with Institute of Electrical and Electronics Engineers 802.3ah standards.

Figure 5:
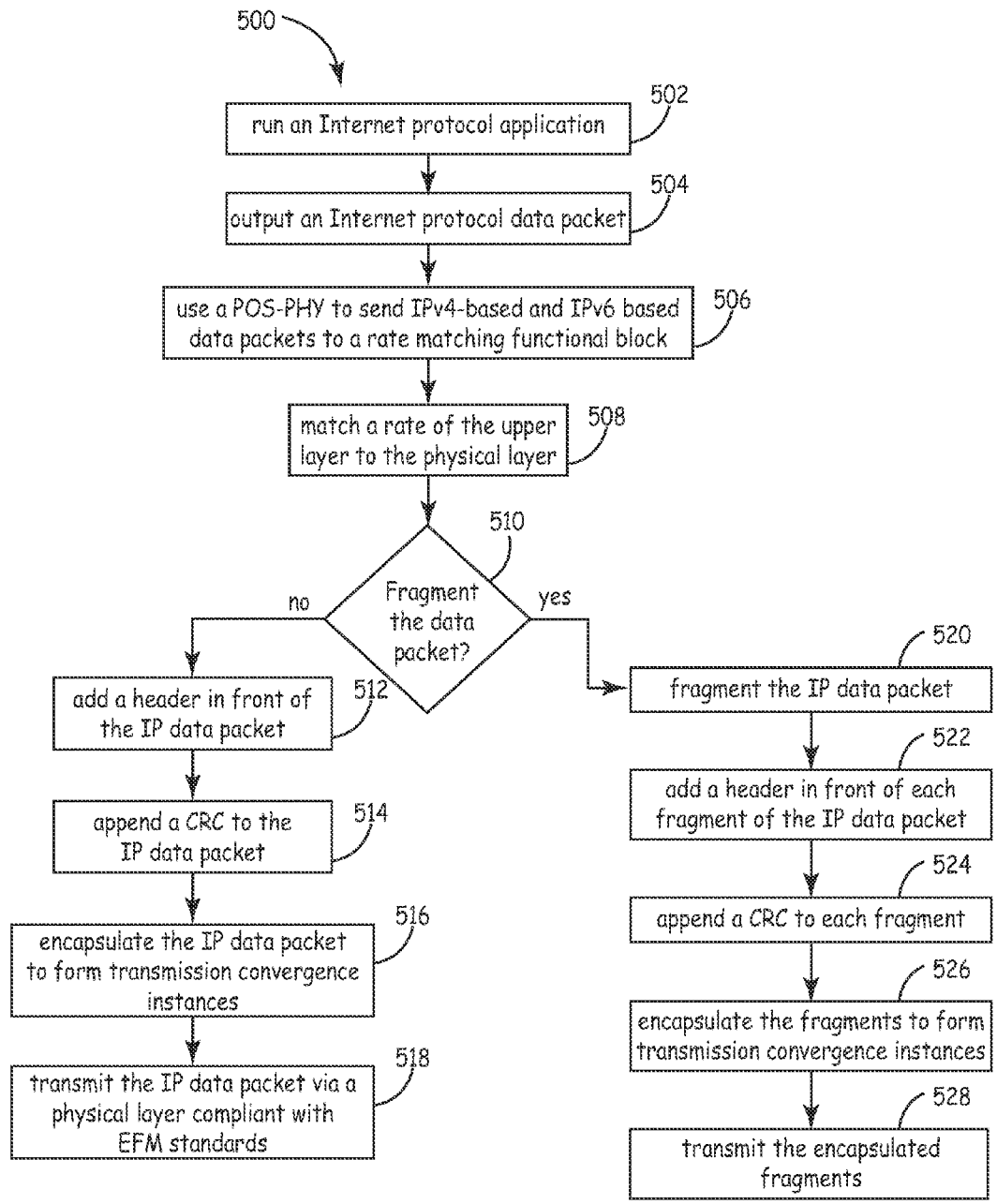
FIG. 5 is a flow diagram of one embodiment of a method to transmit Internet protocol data packets when the system includes a digital subscriber line bonded group.

FIG. 5 is a flow diagram of one embodiment of a method 500 to transmit Internet protocol data packets when the system 10 includes a digital subscriber line bonded group 50. FIG. 6 is a block diagram of one embodiment of a portion of the Ethernet first mile physical coding sublayers for sending and receiving Internet protocol data packets in accordance with the present invention. Method 500 is described with reference to FIGS. 1, 4 and 6. The physical coding sublayer 209 in FIG. 6 is part of the DSL device 33 in FIG. 1. The physical coding sublayer 211 in FIG. 6 is part of the DSL device 43 in FIG. 1. The physical coding sublayers 209 and 211 include to the physical aggregation functional blocks 120 and 220, respectively, and the rate matching functional blocks 110 and 111, respectively. The physical aggregation functional block 220 is similar in structure and function to the physical aggregation functional block 120 as described above with reference to FIG. 4. Likewise, the rate matching functional block 111 is similar in structure and function to the rate matching functional block 110 as described above with reference to FIG. 4. Additionally, the 64/65 TC encoding functional blocks represented generally by the numeral 150 are each a transmission convergence encoding functional block 140 as described above with reference to FIG. 4. The physical medium attachment layer and the physical medium dependent sublayer, which are also part of the Ethernet first mile physical coding sublayer 209 and 211, are not explicitly shown in FIG. 6.

At block 502, an Internet protocol application is run. In one implementation of this embodiment, the processor 32 (FIG. 1) runs the Internet protocol application in the DSL system 30.

At block 504, an Internet protocol data packet is output based on the running of the Internet protocol application. In one implementation of this embodiment, the processor 32 (FIG. 1) outputs an Internet protocol data packet. The Internet protocol data packet includes an Internet protocol packet header and data or a payload.

At block 506, a passive optical system-physical layer is used to send IPv4-based and IPv6-based data packets to a rate matching functional block. In one implementation of this embodiment, a POS-PHY interface 131 (FIG. 4) is used to send IPv4-based and IPv6-based data packets from a IPv4 or IPv6 application 215 to the rate matching functional block 110. In another implementation of this embodiment, a POS-PHY interface 131 (FIG. 4) is used to send data packets based other Internet protocols or on Internet protocols yet to be developed to the rate matching functional block 110.

At block 508, the data rate of an upper layer is matched to the data rate of the physical layer. In one implementation of this embodiment, the rate matching functional block 110 matches the rate of the Internet protocol layer 212 to the rate of the physical DSL bonded group 50.

At block 510, it is determined if the data packet is to be fragmented. The determination is based on the size of the data packet and the size of the fragments of data packets that are transmitted from the Ethernet first mile physical coding sublayer 210. There is a negative determination at block 510 if the size of the data packet is less than or equal to the minimum fragment size to be sent over a single link in the DSL group 50. In this case, the flow proceeds to block 512.

At block 512, a PAF header is appended in front of the Internet protocol data packet. Since the data packet is not fragmented, both the start-of-packet bit and the end-of-packet bit are set in the begin field and the end field, respectively. In one implementation of this embodiment, the physical aggregation functional block 120 appends the PAF header in the 802.3ah standard format in the front of the Internet protocol data packet.

At block 514, a CRC is appended to each Internet protocol data packet. In one implementation of this embodiment, the physical aggregation functional block 120 appends the CRC to the Internet protocol data packet. At block 516, the Internet protocol data packet is encapsulated with the CRC to form transmission convergence instances. In one implementation of this embodiment, the transmission convergence (TC) encoding functional block 140 encapsulates the Internet protocol data packet with the CRC to form transmission convergence instances. In one implementation of this embodiment, the transmission convergence instances are 64/65 octet transmission convergence instances.

At block 518, the Internet protocol data packet is transmitted via the physical layer compliant with the Ethernet first mile standards, such as IEEE 802.3ah standards. In one implementation of this embodiment, the transmission convergence (TC) encoding functional block 140 transmits the Internet protocol data packet from the physical layer 210. The digital subscriber line bonded group 50 represented by the arrow 50 in FIG. 6 is used to send the Internet protocol data packet to a receiving DSL device such as DSL device 43 in FIG. 1.

If there is a positive determination at block 510, the flow proceeds to block 520. At block 520, the data packet is fragmented. In one implementation of this embodiment, the PAF fragmentation block 124 in the physical aggregation functional block 120 fragments the Internet protocol data packet 400 as shown in FIG. 6. The Internet protocol data packet 400 includes the IPv4 or Ipv6 header 420 and data 422. The PAF fragmentation block 124 fragments the data 422 into fragments of fixed or variable size (as described below with reference to FIG. 8).

Figure 6:
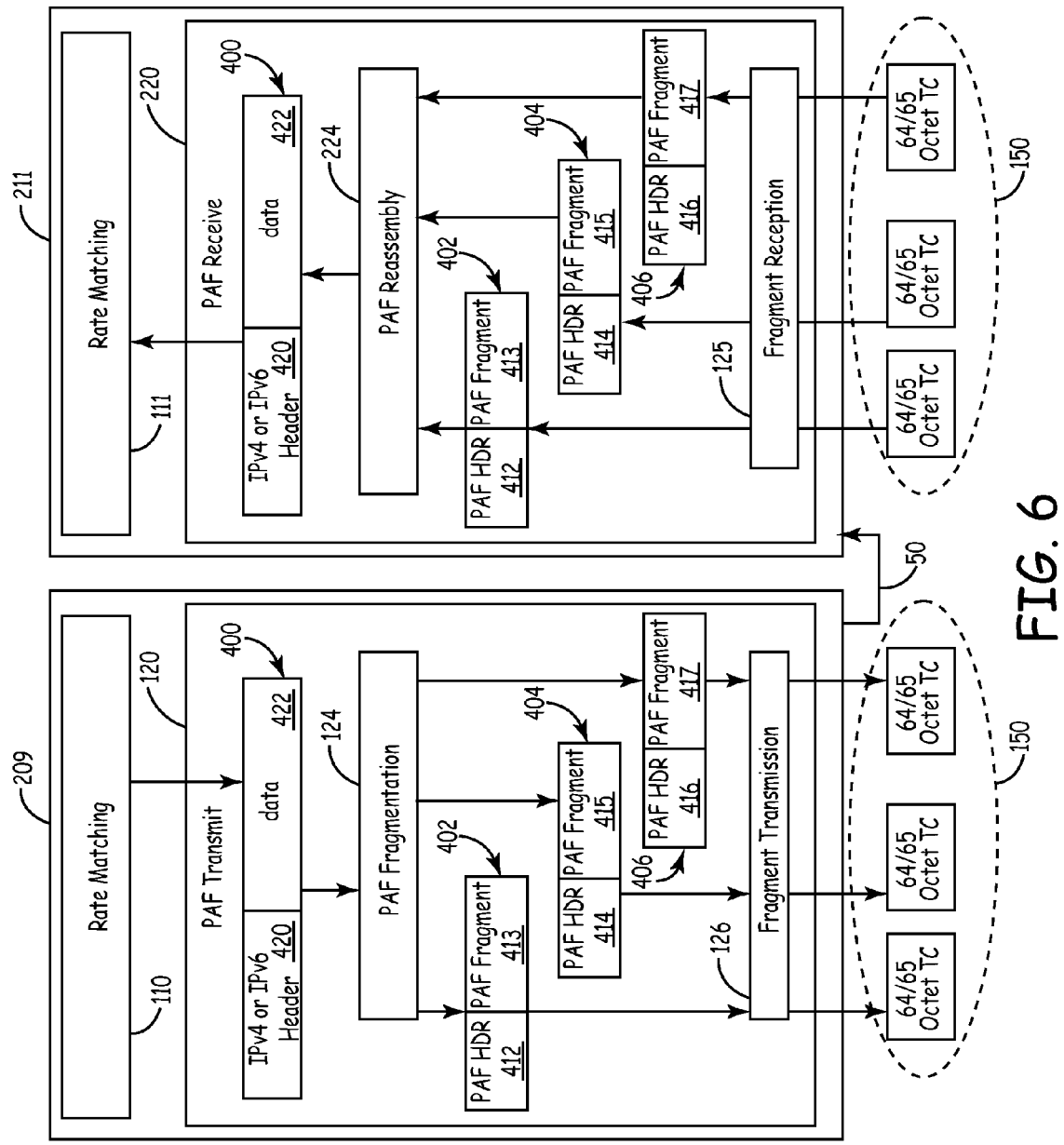
FIG. 6 is a block diagram of one embodiment of a portion of the Ethernet first mile physical coding sublayers sending and receiving Internet protocol data packets in accordance with the present invention.

As shown in FIG. 6, the payload or data 422 is segmented into a first PAF fragment 413, a second PAF fragment 415, and a third PAF fragment 417. The packet fragments are between 64 and 512 octets in length and are assigned in 4 octet increments. In one implementation of this embodiment, a hard coded value in software is used to determine the fragment sizes. In another implementation of this embodiment, a user configured value received from a user via a user interface (not shown) is used to determine the fragment sizes. Other mechanisms to determine the fragment sizes are possible since fragment sizing is not fully specified in the IEEE 802.3ah standard.

At block 522, a PAF header is added to the front of each fragment of the Internet protocol data packet. The start-of-packet field in the PAF header attached to the very first fragment of an Internet protocol data packet is set and the end-of-packet field in the PAF header attached to the last fragment of a packet is set. In the implementation of this embodiment shown in FIG. 6, the PAF fragmentation functional block 124 adds a first PAF header 412 to the front of the first PAF fragment 413 and the start-of-packet field in first PAF header 412 is set to one (1). Likewise, the PAF fragmentation functional block 124 adds a second PAF header 414 to the front of the second PAF fragment 415, and a third PAF header 416 to the front of the third PAF fragment 417. The end-of-packet field in third PAF header 416 is set to one (1) since the third PAF header 416 is attached to the last PAF fragment of the fragmented data packet 400. The start-of-packet and the end-of-packet fields in the PAF headers attached to the fragments in the middle, such as second PAF fragment 415, are not set to one (1) but remain un-set with a zero (0).

At block 524 a cyclic redundancy check is appended to each fragment. The fragment transmission block 126 (FIG. 6) passes the encapsulated fragments to the correct 64/65 TC (Transmission Convergence). At block 526, the fragments including the cyclic redundancy check are encapsulated to form transmission convergence instances. At block 528, the encapsulated fragments are transmitted via the physical medium attachment (PMA) layer and physical medium dependent (PMD) sublayers, which are part of the Ethernet first mile physical coding sublayer. In this manner, the encapsulated fragments are sent from the first digital subscriber line (DSL) system 30 for Internet protocol or routing applications via the digital subscriber line bonded group 50 comprising at least two digital subscriber line bonded pairs that are communicatively coupled to the physical coding sublayer 211 (FIG. 6) of a receiving DSL device 43 (FIG. 1).

The link aggregation is implemented to achieve the most efficient use of bandwidth possible. For example, four links operating at 5 Mbps provide the bandwidth of a single link operating at 20 Mbps.

The fragment size affects link aggregation efficiency. In an exemplary system 10 (FIG. 1) in which fragment size is fixed at maximum of 512 octets and which includes four links each operating at 5 Mbps, a 500 octet packet can be transmitted as fragments or as one packet.

In the latter case, a fragment of 500 octets plus PAF header is created, and transmitted on one link. Total transmission time is around (500 octets+PAF header)/5 Mbps. This transmission has efficiency of a single 5 Mbps link.

In the former case, the 500 octet data packet is segmented into three fragments of 128 octets and a fourth fragment of 116 octets. Each of the four fragments is sent simultaneously on one of the four links, since all four links are transmitting at the same time. In this manner, the packet transmission time is reduced to about a fourth of the time required to send the 500 octet packet over one link. This division of the 500 octet data packet into three fragments of 128 octets and a fourth fragment of 116 octets occurs because of the Ethernet first mile restrictions: the smallest allowed fragment size is 64 octets; and the fragment sizes for all but the last fragment must fall on a 4 octet boundary. For example, the smallest allowed fragment size is 64 octets, the next larger size is 68 octets, the next larger size is 72 octets, etc. The last fragment can be an integer size.

If a 64 octet data packet is to be transmitted in the exemplary system 10 described above, the single 64 octet fragment is sent down the first link since the 64 octet data packet cannot be segmented into smaller fragments because of the Ethernet first mile imposed restriction that the minimum allowed fragment size is 64 octets.

As described above, if system 10 is configured for only one digital subscriber link port, the physical aggregation functional block 120 is bypassed. In this case, the Internet protocol data packets are sent directly from the rate matching functional block 110 to the transmission convergence encoding block 140 and only blocks 502, 504, 506, 508, 514, 516 and 518 are implemented in the flow diagram of method 500 to transmit Internet protocol data packets. In this manner, a single encapsulated fragment is sent from the first digital subscriber line (DSL) system 30 for Internet protocol or routing applications via the digital subscriber line bonded group 50 comprising a single digital subscriber line bonded pair.

Figure 7:
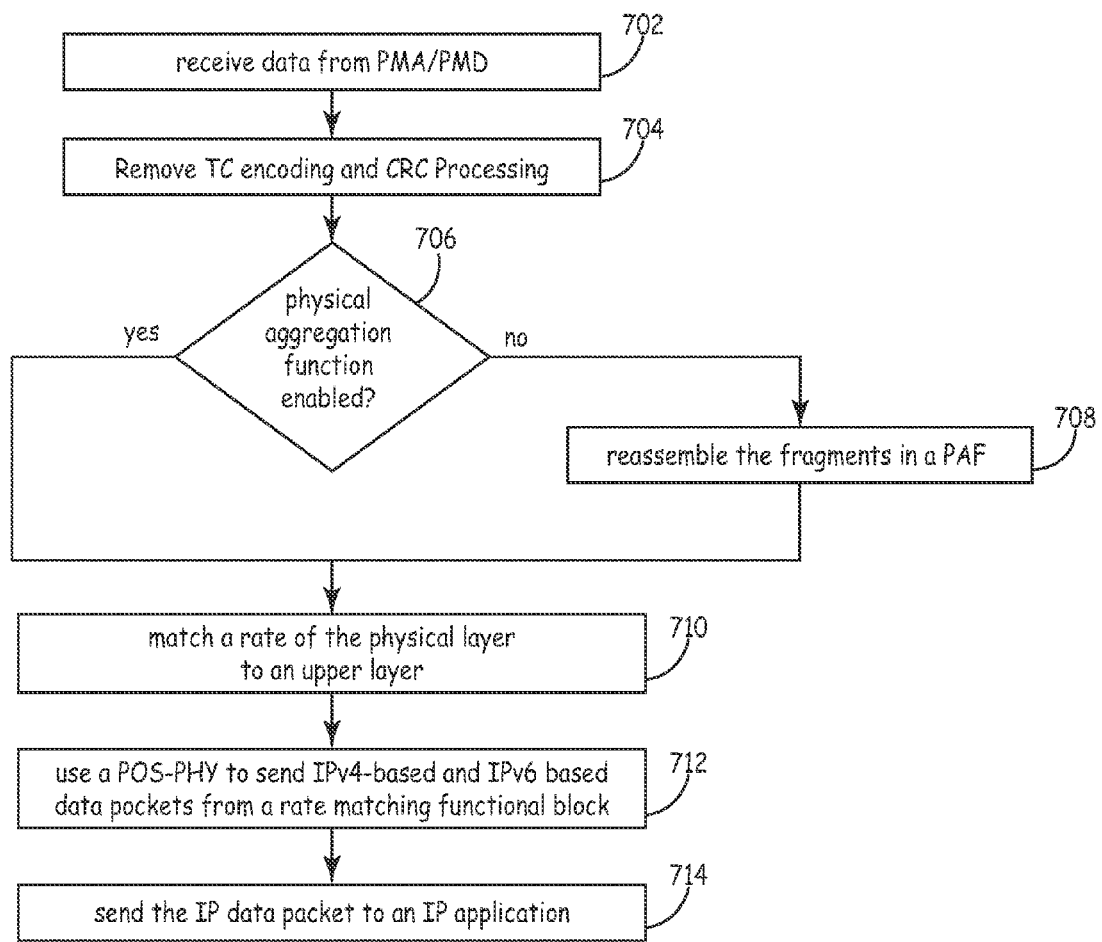
FIG. 7 is a flow diagram of one embodiment of a method to receive Internet protocol data packets in accordance with the present invention.

FIG. 7 is a flow diagram of one embodiment of a method 700 to receive Internet protocol data packets in accordance with the present invention. Method 700 is described with reference to FIGS. 1, 4 and 6.

At block 702, fragments of the Internet protocol data packet are received from the physical medium attachment sublayer (PMA) and the physical medium dependent sublayer (PMD) of the Ethernet first mile physical coding sublayer at the 64/65 TC encoding functional blocks 150. In one implementation of this embodiment, the encapsulated fragments 402, 404 and 406 are received at the 64/65 TC encoding functional blocks 150 of the second digital subscriber line system 40 (FIG. 1) for Internet protocol or routing applications via the digital subscriber line bonded group 50.

At block 704, the transmission convergence encoding and the cyclic redundancy check processing are removed. In one implementation of this embodiment, the fragment reception 125 (FIG. 6) in the Ethernet first mile physical coding sublayer 211 includes the transmission convergence encoding functional block 140, which removes the transmission convergence encoding and the cyclic redundancy check processing as defined in IEEE 802.3ah.

At block 706, it is determined if the physical aggregation function is enabled. If system 10 (FIG. 1) is configured with more than one DSL port, the physical aggregation function is enabled. If it is determined at block 706, that the physical aggregation function is enabled, the flow proceeds to block 708.

At block 708, the fragments are reassembled in a physical aggregation function. As shown in FIG. 6, the encapsulated fragments, 402, 404 and 406, are received at the fragment reception 125 and sent to the PAF reassembly block 224 of the physical aggregation functional (PAF) block 220 in the Ethernet first mile physical coding sublayer 211. The PAF reassembly block 224 reassembles the fragments 413, 415, and 417 based on the respective attached PAF headers 412, 414, and 416. The reassembled fragments form the data packet 400 that includes a IPv4 or IPv4 header 420 and a payload or data 422. The flow proceeds to block 710.

If the physical aggregation function is enabled and the start-of-packet and end-of-packet are both set in the received fragment, the fragment is a complete Internet protocol data packet that is smaller than or equal to the minimum fragment size. In this case, the single data packet is sent through the physical aggregation function although there is only one fragment on which to operate.

If it is determined at block 706, that the physical aggregation function is not enabled, the flow bypasses block 708 and proceeds to block 710. If system 10 (FIG. 1) is configured with only one DSL port, the physical aggregation function is not enabled.

At block 710, a rate of the physical layer is matched to an upper layer. In one implementation of this embodiment, the data packet 400 is sent from the physical aggregation functional (PAF) block 220 to the rate matching block 111 that are both in the Ethernet first mile physical coding sublayer 211 (FIG. 6).

At block 712, a passive optical system-physical layer is used to send IPv4-based and IPv6 based data packets from a rate matching functional block. In one implementation of this embodiment, the Ethernet first mile physical coding sublayer 211 uses the POS-PHY interface 41 (FIG. 1) to send IPv4-based and IPv6 based data packets 400 from the rate matching functional block 111 (FIG. 6).

At block 714, the Internet protocol data packet is sent to an Internet protocol application based receiving the fragments. In one implementation of this embodiment, the Internet protocol data packet 400 is sent to an Internet protocol application based receiving the fragments 402, 404, and 406.

Figure 8:
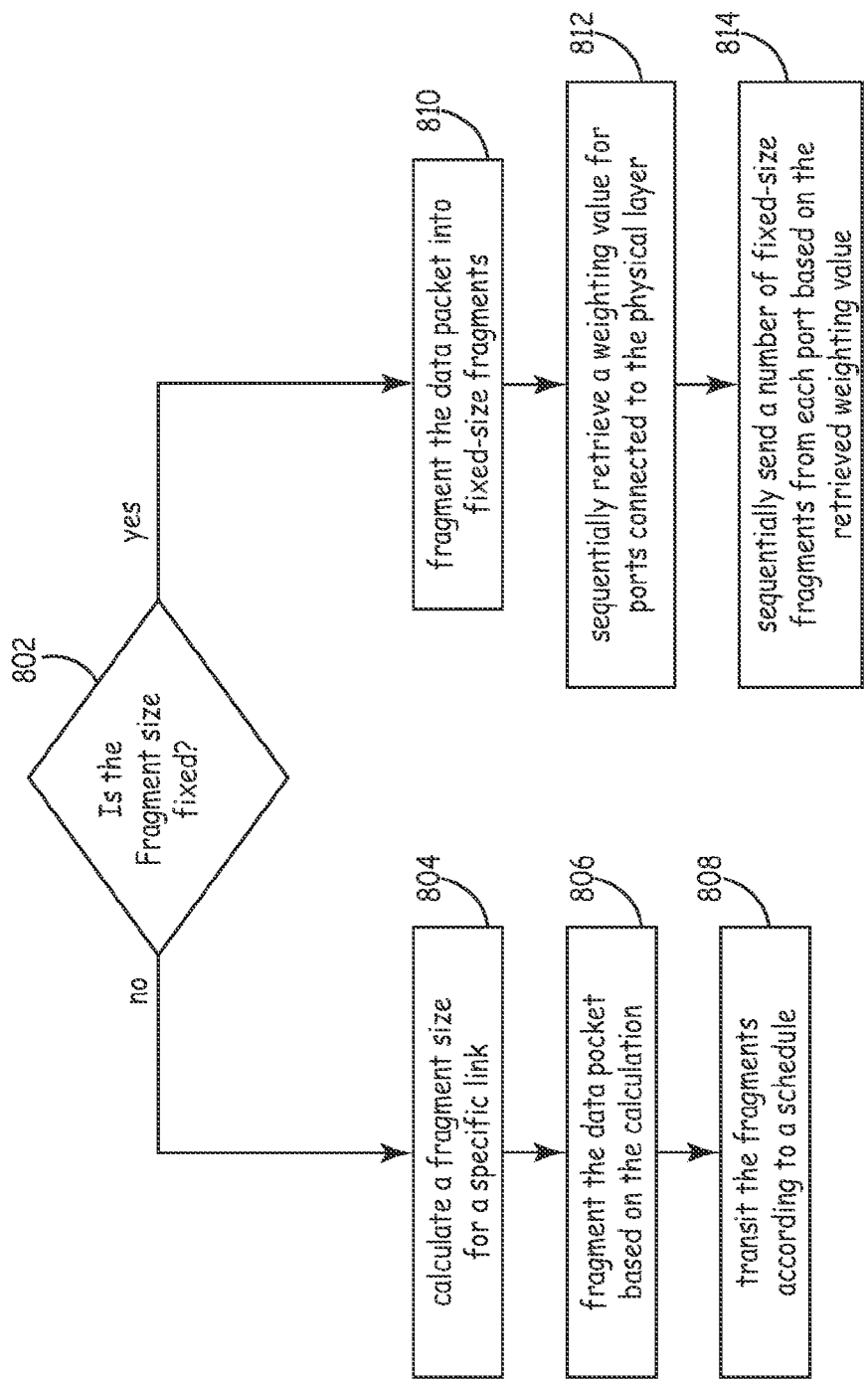
FIG. 8 is a flow diagram of one embodiment of a method to determine a fragment size and to transmit Internet protocol fragments according to a schedule in accordance with the present invention.
Figure 9:
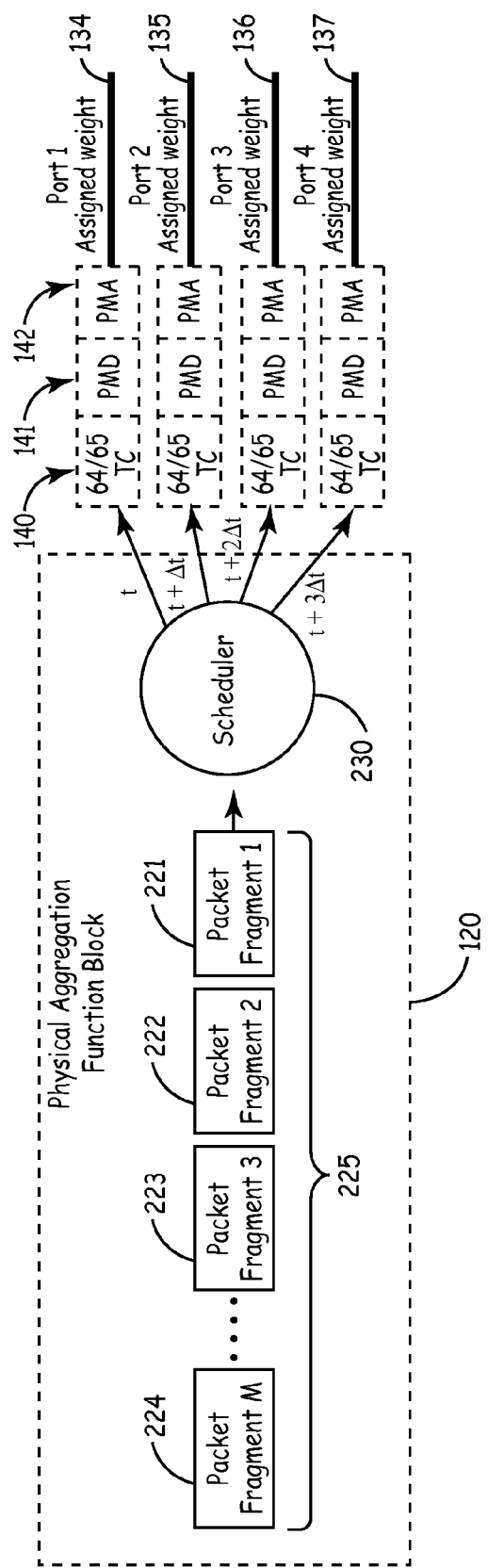
FIG. 9 is a block diagram of one embodiment for scheduling transmission of the fragments in accordance with the present invention.

FIG. 8 is a flow diagram of one embodiment of a method 800 to determine a fragment size and to transmit Internet protocol fragments according to a schedule in accordance with the present invention. FIG. 9 is a block diagram of one embodiment for scheduling transmission of the fragments in accordance with the present invention. The method 800 is described in part with reference to FIG. 9. The method 800 provides dynamic allocation of fragment sizes per link, and per transmission round, with the goal of achieving maximum transmission efficiency as close to the aggregate link rate as possible.

At block 802, it is determined if the fragment size is fixed. If the fragment sizes are not fixed, the flow proceeds to block 804. At block 804, a fragment size is calculated for each specific link in the digital subscriber line bonded group 50 (FIG. 1). There are a number of variables used in the calculation of the fragment size. These variables include: the size of packet to be transmitted; the number of links in DSL bonded group 50; the link speed for each of the links in the digital subscriber link bonded group 50; the minimum and maximum fragment sizes (defined in 802.3ah as 64 octets and 512 octets); the differential delay limitations defined (set in one implementation as 15000 bit times); and the maximum link speed differences (defined in one implementation as 4 to 1).

In one implementation of this embodiment, the digital subscriber line bonded group 50 in the system 10 (FIG. 1) contains N links, where N is >1 and where each link in the digital subscriber line bonded group 50 is identified with a number from number 1 to N. Each fragment size is individually calculated for each specific link in the digital subscriber line bonded group 50. Table 3 outlines an exemplary algorithm executable by the processor 32 in the first DSL system 30 to calculate the fragment size for each link Ito N. Other algorithms executable by the processor 32 in the first DSL system 30 can be used to calculate the fragment size for each link Ito N are possible.

TABLE 3

If size of packet for transmission is ≦ 64 bytes // link agg doesn't work for small packets
Create a single fragment and send on the highest speed link
Done
Else
Calculate maximum number of bytes that can be sent per round = Max Bytes
While Current packet size > 0
    If Current packet size ≧ Max Bytes
        Create N fragments, individually sized, one for each link
        Transmit fragments on links
        Current Packet Size = Current Packet Size − Max Bytes
    Else
        // Current Packet Size < Max Bytes// this means we can send all remaining bytes in this round
        Create up to N Fragments, individually sized, for up to N links
        Transmit fragments on links
Done
Link n Fragment size (intermediate round) Fragment size = round down to nearest 4 byte boundary (link n speed / highest speed link * 512)
Link n fragment size (final round) = larger of 64 bytes or
Round down to nearest 4 byte boundary
    (link i speed / aggregate link speed * Current Packet Size)
        Max Bytes =
        // this is the maximum theoretical number of bytes than can be sent in a round
        // bounded by 512 byte fragment size on highest speed port.
        For all links, add (Speed link n / Highest Link Speed * 512).
        Round down to nearest 4 bytes.

At block 806, the data packet (such as data packet 400 in FIG. 6) is fragmented based on the calculation. At block 808, the fragments are transmitted according to a schedule. In one implementation of this embodiment, the processor 32 executes a scheduling algorithm to transmit the fragments according to a schedule. Because of the fragmenting of the data packet based on the calculation, the bonded group approaches the efficiency of a single link with an aggregate bandwidth of all links in the bonded group.

If it is determined at block 802 that the fragment sizes are fixed, the flow proceeds to block 810. At block 810, the data packet is fragmented into fixed-size fragments. At block 812, a weighting value for ports connected to the physical layer is sequentially retrieved. The weighting factor is calculated when bonded group is created or when a link is added or modified and the assigned weighting factor for each bonded group is stored in a memory. The assigned weighing factor is sequentially retrieved from the memory.

At block 814, a number of fixed-size fragments are sequentially sent from each port based on the retrieved weighting value. The fixed-size fragments are sequentially sent prior to retrieving the weighting value of the next port in the round.

In one implementation of this embodiment, the scheduling algorithm includes weighted-round-robin-like scheduler 230, as shown in FIG. 9. With fixed size fragmentation, it is possible to achieve efficient use of the aggregate bandwidth by scheduling packet transmission. A scheduling algorithm executed by the scheduler 230 in the physical aggregation functional block 120 is used to determine where and when to send packets. The scheduler 230 simulates a generalized processor sharing algorithm.

Normally in a packet switch environment, schedulers are used to schedule queues having N packets for a single port. However, in this embodiment, a single queue 225 is created by the fixed size packet fragments 221, 222, 223, and 224 and the packet fragments 221, 222, 223, and 224 are scheduled onto multiple ports, shown as first port 134, second port 135, third port 136 and fourth port 137. More ports can be implemented. The queue 225 is formed by the physical aggregation functional block 120. Each port is assigned a weight. The weight is derived using the following algorithm:

Weight=the greater of 1 or

Integer value of (port speed/sum of all port speeds*number of ports).

Weighted-round-robin works best with fixed sized blocks or fragments such as fixed size packet fragments 221, 222, 223, and 224 although it is possible to schedule weighted-round-robin with variable size packets. An exemplary weighted-round-robin process is described with reference to FIG. 9. The scheduler 230 visits all ports 134, 135, 136 and 137 in a single round. At each port 134, 135, 136 and 137 the weight of the port is examined. In an exemplary case, the scheduler 230 starts the round by checking the weight of the first port 134 at a time t. The scheduler 230 sees the first port 134 has a weight value of 1, so the first packet fragment 221 in the queue is retrieved by the scheduler 230 and the first packet fragment 221 is sent from the first port 134 via the transmission convergence layer shown as blocks TC, PMD and PMA in FIG. 9. The scheduler 230 then sequentially moves to the next or second port 135 at the time (t+Δt) and checks the weight of the second port 135. In this exemplary case, the second port 2 has a weight of 2 so the next two packet fragments in the queue 225 (e.g., packet fragment 222 and packet fragment 223) are retrieved by the scheduler 230 and are sent from the second port 135 via the transmission convergence layer. The scheduler 230 then sequentially moves to the next or third port 136 at about the time (t+2Δt), checks the weight of the third port 136 and sends the appropriate number of packet fragments from the third port 136 via the transmission convergence layer. Likewise, the scheduler 230 then sequentially moves to the next or fourth port 137 at about the time (t+3Δt), checks the weight of the fourth port 137 and sends the appropriate number of packet fragments from the fourth port 137 via the transmission convergence layer. The fragments 221, 222, 223, and 224 appear to be scheduled and sent almost simultaneously since Δt is small and the scheduler 230 operates at such a fast rate relative to link speed.

The number of packet fragments sent is equal to the integral weighting factor, so that if the weight of a port is 4, then the first four packet fragments remaining in the queue are sent from that port before the scheduler moves to the next port. This process continues until all ports have been visited, and the round is complete. Then the scheduler 230 begins another round. A port that is twice the speed of another will be allocated 2 fragments to every 1 fragment for the other. This is consistent with the physical characteristics that one port can send 2 fragments in the same time that the other can send one.

In one implementation of this embodiment, the DSL devices implement G.SHDSL, which is defined as 2BASE-TL in IEEE 802.3ah that implements ITU G.991.2 G.SHDSL. In another implementation of this embodiment, the DSL devices implement 10PASS-TL, which conforms to the VDSL standard, ANSI T1.424.

Figure 10:
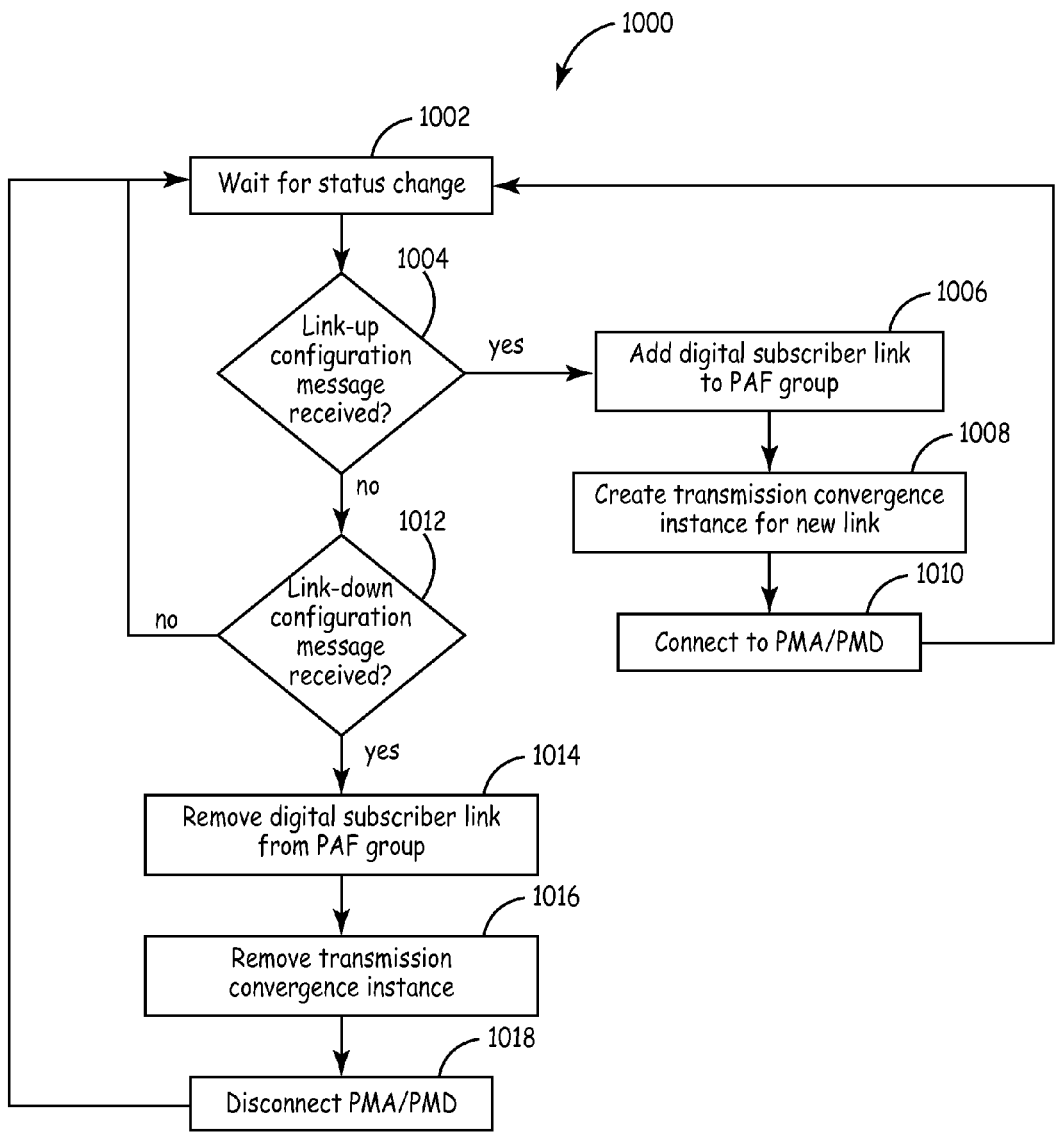
FIG. 10 is a flow diagram of one embodiment of a method to adjust a number of digital subscriber lines in a physical aggregation function group.

FIG. 10 is a flow diagram of one embodiment of a method 1000 to adjust a number of digital subscriber lines in a physical aggregation function group. The physical aggregation function group, which comprises at least two digital subscriber line bonded pairs that connect to a common destination, is formed when the user first creates the bonded group. Then the number of digital subscriber lines in a physical aggregation function group can be adjusted while receiving fragments. Method 1000 is described with reference to FIGS. 1 and 4.

At block 1002, the processor 32 in the system 10 waits for a status change. The status change includes events such as a link failure, the activation of a new link after the new link is plugged in, or someone pulling the cord on the system. In these cases the system user adds a link to the group or removes a link from the group by sending a link-up configuration message or by sending a link-down configuration message.

If the processor 32 receives a link-up configuration message at block 1004, the flow proceeds to block 1006. At block 1006, a digital subscriber link is added to the physical aggregation function group as defined in IEEE 802.3ah. At block 1008, the transmission convergence instance is created for the new link. At block 1010, the new link is connected to the physical medium attachment sublayer (PMA) 141 and the physical medium dependent sublayer (PMD) 142.

If the processor 32 does not receive a link-up configuration message at block 1004, the flow proceeds to block 1012. If the processor 32 receives a link-down configuration message at block 1012, the flow proceeds to block 1014. At block 1014, at least one digital subscriber link is removed from the physical aggregation function group as defined in IEEE 802.3ah. At block 1016, the transmission convergence instance for the removed link is removed. At block 1018, the removed link is disconnected from the physical medium attachment sublayer (PMA) 141 and the physical medium dependent sublayer (PMD) 142.

If the processor 32 does not receive a link-down configuration message at block 1012, the flow proceeds to block 1002. The processor continues to check for status changes by checking for link-up and link-down configuration messages.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method to transmit and receive Internet protocol data packets, the method comprising:

providing a device in a system; running an Internet protocol application on a processor in the system;

outputting an Internet protocol data packet from the processor to the device, the Internet protocol data packet being sent without Ethernet frame encapsulation via a physical layer interface configured to pass the Internet protocol data packet from an Internet protocol layer directly to a physical layer of the device, the outputting being based on the running of the Internet protocol application; and transmitting the Internet protocol data packet via the physical layer from the device, wherein transmitting the Internet protocol data packet comprises:

matching a rate of the Internet protocol layer to the rate of a physical line bonded group; and determining if the Internet protocol data packet is to be fragmented;

using a physical layer interface to send Internet Protocol v4-based and Internet Protocol v6 based data packets to a rate matching functional block, wherein the rate matching functional block matches a rate of the physical layer to a rate of the Internet protocol layer.

2. The method of claim 1, further comprising:
sending the Internet protocol data packet without Ethernet frame encapsulation from the physical layer interface to a physical aggregation functional block via a rate matching functional block in the device; and
receiving the Internet protocol data packet at the physical layer interface from the physical aggregation functional block via the rate matching functional block in the device.

3. The method of claim 2, wherein receiving the Internet protocol data packet at the physical layer interface from the physical aggregation functional block via the rate matching functional block comprises:
using a passive optical system-physical layer to send IPv4-based and IPv6 based data packets from a rate matching functional block.

4. The method of claim 2, wherein the physical layer comprises at least two line bonded pair, the method further comprising:
adjusting a number of lines in a physical aggregation function group while receiving the fragments, wherein the physical aggregation function group comprises more than one line bonded pair that connect to a common destination.

5. The method of claim 4, wherein adjusting the number of lines in the physical aggregation function group comprises:
waiting for status change;
receiving one of a link-up configuration message and a link-down configuration message;
adding a link to the physical aggregation function group based on receiving the link-up configuration message; and
removing a link from the physical aggregation function group based on receiving the link-down configuration message.

6. The method of claim 1 further comprising:
when the Internet protocol data packet is not fragmented, appending a cyclic redundancy check to each Internet protocol data packet;
when the Internet protocol data packet is fragmented, inserting a physical aggregation function header and appending a cyclic redundancy check to each Internet protocol data packet fragment; and
encapsulating the Internet protocol data packet to form transmission convergence instances.

7. The method of claim 6, wherein the transmission convergence instances are 64/65 octet transmission convergence instances.

8. The method of claim 1, wherein the physical layer comprises at least two line bonded pairs, the method further comprising:
forming a physical aggregation function group comprising more than one line bonded pair that connect to a common destination;
fragmenting the Internet protocol data packet based on the positive determination;
appending a cyclic redundancy check to each fragment;
encapsulating the fragments to form transmission convergence instances, wherein transmitting the Internet protocol data packet comprises:
transmitting the encapsulated fragments via physical medium attachment layer and physical medium dependent sublayers.

9. The method of claim 8, further comprising:
adjusting a number of lines in a physical aggregation function group while transmitting the fragments.

10. The method of claim 8, wherein transmitting the fragments comprises transmitting the fragments according to a schedule.

11. The method of claim 8, wherein transmitting the fragments comprises:
determining a fragment size; and
transmitting the fragments according to a schedule.

12. The method of claim 11, wherein determining a fragment size comprises:
calculating a fragment size for a specific link; and
fragmenting the Internet protocol data packet based on the calculation, wherein a bonded group approaches the efficiency of a single link with an aggregate bandwidth of all links in the bonded group.

13. The method of claim 11, wherein determining a fragment size comprises:
fragmenting the Internet protocol data packet into fixed-size fragments, and wherein transmitting the fragments according to a schedule comprises:
sequentially retrieving a weighting value for ports connected to the physical layer in a round; and
sequentially sending a number of fixed-size fragments from each port based on the retrieved weighting value, wherein a bonded group provides the efficiency of a single link with an aggregate bandwidth of all links in the bonded group.

14. The method of claim 1, wherein transmitting the Internet protocol data packet comprises:
using a passive optical system-physical layer to send IPv4-based and IPv6 based data packets to send the Internet protocol data packets to a rate matching functional block.

15. The method of claim 1, wherein the physical layer comprises at least one line bonded pair, the method further comprising:
changing a number of line bonded pairs in a bonded group while transmitting the Internet protocol data packet.

16. The method of claim 1, further comprising: receiving the Internet protocol data packet via the physical layer;
matching a rate of the physical layer to an Internet protocol layer; and
sending the Internet protocol data packet to an Internet protocol application.

17. The method of claim 16, wherein sending the Internet protocol data packet comprises:
using a passive optical system-physical layer to send IPv4-based and IPv6 based data packets from a rate matching functional block.

18. The method of claim 1, wherein the Internet protocol data packet is transmitted according to Institute of Electrical and Electronics Engineers 802.3ah standards at the physical layer.

19. The method of claim 1, wherein transmitting the Internet protocol data packet via the physical layer comprises:
transmitting the Internet protocol data packet via the physical layer through a device that is compliant with one of an ITU G.991.2 SHDSL standard, a VDSL standard, and an ANSI TI.424 standard.

20. A system to transfer Internet protocol data packets, the system comprising:
a first device configured to receive output from a first Internet protocol application via a first interface;
a line bonded group communicatively coupled to the first device; and a second device communicatively coupled to the line bonded group, wherein the second device is communicatively coupled to receive the output from the first Internet protocol application from the first device, and wherein the second device is configured to send the received output to a second Internet protocol application in the second device via a second interface in the second device, wherein the first device is configured to send Internet protocol data packets without Ethernet frame encapsulation directly from an Internet protocol layer of the first device to a physical layer of the first device, and wherein the second interface in the second device is configured to send the Internet protocol data packets, without Ethernet frame encapsulation, directly to an Internet protocol layer of the second device from a physical layer of the second device, wherein transmitting the Internet protocol data packet comprises:

matching a rate of the Internet protocol layer to the rate of a physical line bonded group; and determining if the Internet protocol data packet is to be fragmented;

using a physical layer interface to send Internet Protocol v4-based and Internet Protocol v6 based data packets to a rate matching functional block, wherein the rate matching functional block matches a rate of the physical layer to a rate of the Internet protocol layer.

21. The system of claim 20, wherein the first interface and second interface each comprise a passive optical system physical layer interface.

22. The system of claim 20, wherein the first device is configured in a routing mode, and wherein the second device is configured in a routing mode.

23. The system of claim 20, wherein the line bonded group comprises a plurality of line bonded pairs.

24. The system of claim 20, wherein the bonded group comprises a line bonded pair.

25. A system architecture to transfer Internet protocol data packets, the systems architecture comprising:

a network processor configured to transmit the Internet protocol data packets;

a physical layer interface communicatively coupled to the network processor;

a device communicatively coupled to the physical layer interface, wherein the physical layer interface is configured to directly pass the Internet protocol data packets without Ethernet frame encapsulation from an Internet protocol layer to a physical layer in the device, wherein transmitting the Internet protocol data packet comprises:

matching a rate of the Internet protocol layer to the rate of a physical line bonded group; and determining if the Internet protocol data packet is to be fragmented;

using a physical layer interface to send Internet Protocol v4-based and Internet Protocol v6 based data packets to a rate matching functional block, wherein the rate matching functional block matches a rate of the physical layer to a rate of the Internet protocol layer.

26. The system architecture of claim 25, wherein the device comprises:

a rate matching functional block configured to match a rate of a physical layer to an Internet protocol layer; and a transmission convergence encoding block configured to encode the Internet protocol data packets with a cyclic redundancy check.

27. The system architecture of claim 26, wherein the transmission convergence encoding block is enabled to encapsulate 64 bytes to 65 bytes in accordance with the Institute of Electrical and Electronics Engineers 802.3ah standards.

28. The system architecture of claim 26, the system further comprising:

a physical aggregation functional block configured to fragment the Internet protocol data packets wherein the transmission convergence encoding block is configured to encode the fragments of the Internet protocol data packets with the cyclic redundancy check.

29. The system architecture of claim 25, wherein the device is a digital subscriber line device including a physical medium and wherein the physical medium of the digital subscriber line device is compliant with at least one of ITU G.991.2 SGDSL and optionally VDSL standards, and ANSI T1.424 standards.

30. A method to transmit and receive Internet protocol data packets, the method comprising:

running an Internet protocol application in a first device;

transferring the Internet protocol data packets, configured without Ethernet frame encapsulation, across a physical layer interface from an Internet protocol layer of the first device directly to a physical layer of the first device;

sending Internet protocol data packets without Ethernet frame encapsulation from the first device;

receiving the Internet protocol data packets without Ethernet frame encapsulation at a second device communicatively coupled to the first device; and transferring the Internet protocol data packets, received without Ethernet frame encapsulation at the second device, across a physical layer interface of the second device to an Internet protocol layer of the second device directly from a physical layer of the second device, wherein transferring the Internet protocol data packet comprises:

matching a rate of the Internet protocol layer to the rate of a physical line bonded group; and determining if the Internet protocol data packet is to be fragmented;

using a physical layer interface to send Internet Protocol v4-based and Internet Protocol v6 based data packets to a rate matching functional block, wherein the rate matching functional block matches a rate of the physical layer to a rate of the Internet protocol layer.

31. The method of claim 30, further comprising:

fragmenting the Internet protocol data packets at the first device;

adding a header and appending a cyclic redundancy check to the fragments; and transmitting the fragments over a line bonded group comprising at least two line bonded pair.

32. The method of claim 31, wherein receiving the Internet protocol data packets comprises:

receiving the fragments of the Internet protocol data packets at the second device;

reassembling the fragments in a physical aggregation function of the second device;

matching a rate of the physical layer to an upper layer; and sending the Internet protocol data packets to an Internet protocol application in the second device based on receiving the fragments.

* * * * *